United States Patent
Nagai

(10) Patent No.: US 8,537,792 B2
(45) Date of Patent: Sep. 17, 2013

(54) TERMINAL CONTROL APPARATUS AND RADIO LAN SYSTEM

(75) Inventor: Yukimasa Nagai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1516 days.

(21) Appl. No.: 11/887,143

(22) PCT Filed: May 2, 2006

(86) PCT No.: PCT/JP2006/309170
§ 371 (c)(1),
(2), (4) Date: Sep. 26, 2007

(87) PCT Pub. No.: WO2006/120979
PCT Pub. Date: Nov. 16, 2006

(65) Prior Publication Data
US 2009/0109936 A1    Apr. 30, 2009

(30) Foreign Application Priority Data

May 10, 2005  (JP) .................................. 2005-137507

(51) Int. Cl.
*H04W 4/00* (2009.01)
(52) U.S. Cl.
USPC ....................................................... 370/338
(58) Field of Classification Search
None
See application file for complete search history.

(56) References Cited

U.S. PATENT DOCUMENTS 7,609,674 B2 * 10/2009 Kwon et al. ................. 370/329
2005/0208956 A1 * 9/2005 Takagi et al. ................ 455/464

FOREIGN PATENT DOCUMENTS

| WO | WO-03/067827 A1 | 8/2003 |
| WO | WO-2005/039105 A1 | 4/2005 |
| WO | WO-2006/025680 A1 | 3/2006 |

OTHER PUBLICATIONS

Utsunomiya et al., "IEEE802.11-kei Musen LAN ni Okeru 40MHz Tanmatsu tono Kyozon o Koryo shita MAC Protocol," IEICE Technical Report, vol. 104, No. 596, (CS2004-197), 2005, pp. 83-88.
"Broadband Radio Access Netowrks (BRAN); HIPERLAN Type 2; Data Link Control (DLC) Layer, Part 1: Basic Data Transport Functions," ETSI TS 101 761-1 V1.1.1, ETSI, 2000, pp. 1-87.
IEEE Standard for Information technology, Telecommunications and information exchange between systems, Local and metropolitan area networks, Specific requirements, Part 11: Wireless LAN Medium Access Control (MAC) and Physical Layer (PHY) specifications: Amendment: Medium Access Control (MAC) Quality of Service (QoS) Enhancements, IEEE P802.11e/D13.0, 2005, pp. 1-182.
McFarland et al. "The 5-UP™ Protocol for Unified Multiservice Wireless Networks" *IEEE Communications Magazine*, pp. 74-80, (2001).

(Continued)

*Primary Examiner* — Chirag G Shah
*Assistant Examiner* — Amarnauth Persaud
(74) *Attorney, Agent, or Firm* — Birch, Stewart, Kolasch & Birch, LLP

(57) ABSTRACT

When prohibiting data transmission by a radio communication terminal, such as a radio communication terminal L-STA, a terminal control apparatus generates radio data including information about a data transmission prohibition time interval in an L-SIG which is a header region which each radio communication terminal can recognize in common, and, if a use state checking unit 21 has checked to see that a channel CH_a is being not used, transmits the radio data to the radio communication terminal L-STA and so on in the form of frames which the radio communication terminal L-STA can recognize by using the channel CH_a.

13 Claims, 7 Drawing Sheets

(56) References Cited

OTHER PUBLICATIONS

Meng et al. "Wireless LAN Revolution: from Silicon to Systems" *IEEE Radio Frequency Integrated Circuits Symposium*, pp. 3-6 (2001).

Utsunomiya et al. "A MAC Protocol for Coexistence between 20/40 MHz STAs for High Throughput WLAN" *IEEE Vehicular Technology Conference*, vol. 3, pp. 1136-1139.

* cited by examiner

| CHSwitch | L-Service #8 | L-Service #9 |
|---|---|---|
| 20→40 | 1 | 0 |
| 40→20 | 0 | 1 |
| No change | 0 | 0 |
| No change | 1 | 1 |

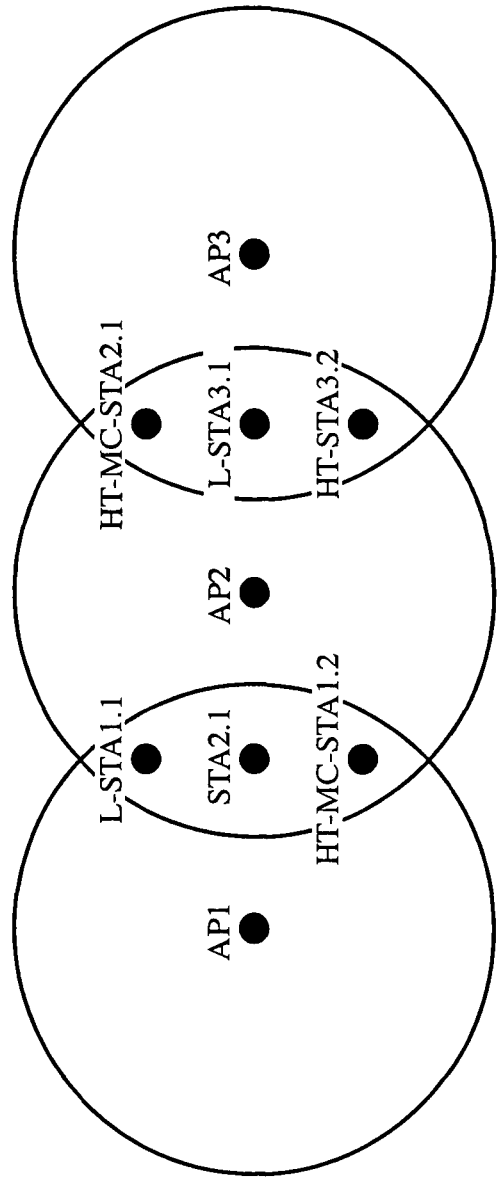

TERMINAL CONTROL APPARATUS AND RADIO LAN SYSTEM

FIELD OF THE INVENTION

The present invention relates to a terminal control apparatus which controls radio communications among radio communication terminals which are connected to one another via a radio LAN, and a radio LAN system.

BACKGROUND OF THE INVENTION

Each radio communication terminal disposed in a radio LAN system senses the carrier of a radio channel in advance of transmission of radio packets via the radio channel, and, when the radio channel is being used (channel busy), refrains from the transmission of the radio packets, whereas when the radio channel is being not used (channel idle), it transmits the radio packets.

Such a method of transmitting radio packets is generally called CSMA (Carrier Sense Multiple Access), and, for example, in accordance with the U.S. radio LAN standard IEEE802.11, CSMA/CA (Carrier Sense Multiple Access with Collision Avoidance) is used (for example, refer to non-patent references 1 and 2).

On the other hand, in accordance with the European radio LAN standard HiperLAN, a TDMA method which provides a transmission opportunity in response to a transmission request from a radio communication terminal is used.

In accordance with the U.S. radio LAN standard IEEE802.11, a communications method of using two or more channels including an extended channel ("Extension Channel" or "Secondary") in addition to a fundamental channel ("Control Channel" or "Primary") has been proposed in order to achieve further-high-speed transmission of radio packets.

Furthermore, in accordance with the U.S. radio LAN standard IEEE802.11, a communications method using a plurality of channels has been also proposed because the necessity of efficient transmission according to the channel capacity becomes high with utilization of an MIMO (Multiple Input, Multiple Output) technology and increase in the channel capacity because of use of a plurality of fundamental channels.

Concretely, the following communications method has been proposed.

For example, a method of enabling an existing radio communication terminal L-STA (Legacy STA (AP)) which carries out radio communications using a channel of a frequency band of 20 Hz, a radio communication terminal HT-STA (High Throughput STA (AP)) which carries out high-speed transmission, such as MIMO, (the frequency band of a channel which is used for the radio communications is 20 Hz), and a radio communication terminal HT-MC-STA (High Throughput Multi channel STA (AP)) which uses a channel of a frequency band of 40 Hz and carries out high-speed radio communications to coexist has been examined. Although the description about STA (AP) shows that each terminal can be an STA (Station) which is a radio LAN terminal, or can be an AP (Access point) which is an access point, a terminal which runs only in either STA or AP depending on the access method is also included.

FIG. 3 shows a frame format of the radio communication terminal L-STA, FIG. 4 shows a frame format of the radio communication terminal HT-STA, and FIG. 5 shows a frame format of the radio communication terminal HT-MC-STA.

In FIGS. 3 to 5, an L-STF (Legacy-Short Training Field) and an L-LTF (Legacy-Long Training Field) which are common fields are proposed by an existing standard, and are fields which all the radio communication terminals can recognize. The L-STF and the L-LTF are also fields which are used for phase synchronization, time synchronization, etc. with data which will be transmitted from now on.

An L-SIG (Legacy SIGNAL field) which is a common field is a field in which a modulation method (Rate), a data length (Length), etc. about the data which will be transmitted from now on are included.

Although in FIGS. 4 and 5 the number of antennas is one for the sake of simplicity, because two or more antennas are used for one channel when using a technology of MIMO, frames as shown in FIGS. 4 and 5 which corresponds to the two or more antennas, respectively, are multiplexed spatially.

An HT-SIG (HT SIGNAL field) is a field which only the radio communication terminal HT-STA and the radio communication terminal HT-MC-STA can recognize (i.e., a field which only the radio communication terminal L-STA cannot recognize), and includes information about the data which will be transmitted from now on.

Furthermore, an HT-SFT, an HT-LTF-1, and an HT-LTF-2 are training fields, and are used for, for example, estimating a transmission path for transmission and reception in communications using two or more antennas, such as MIMO communications.

A Data and an HT-DATA are fields in which actual data which are modulated according to the modulation method specified in the L-SIG or HT-SIG are included.

In the frame format of the radio communication terminal HT-MC-STA of FIG. 5, "Duplicate" shows that the same data as transmitted via a channel CH_a are transmitted via a channel CH_b.

Although the radio communication terminal L-STA can set up a time EIFS (Extended InterFrame Space) when it will complete its data transmission by calculating a time interval during which it will transmit data from information on the modulation method (Rate) and the data length (Length), which is included in the L-STF which is a common field, because regions and an overhead, such as HT-STF, HT-LTF-1, HT-LTF-2, and HT-DATA, which the radio communication terminal L-STA cannot recognize are included in each of the frame formats of the radio communication terminal HT-STA and the radio communication terminal HT-MC-STA, the radio communication terminal L-STA may calculate a wrong transmission time interval length so as to set up the EIFS even if it is going to calculate the actual data transmission time interval from the information about the modulation method (Rate) and the data length (Length) included in the L-SIG which is a common field so as to set up the EIFS.

To solve this problem, a method which is called "Spoofing" has been proposed, and, according to "Spoofing", a combination of the modulation method (Rate) and the data length (Length) is derived and set to the L-SIG so that, in the formats of FIG. 4 and FIG. 5, the calculated data transmission time interval becomes equal to the actual data transmission time interval.

In this case, each of the radio communication terminal HT-STA and the radio communication terminal HT-MC-STA calculates the transmission time interval using HT-Rate and HT-Length for HT which are included in the HT-SIG or the like.

However, "Spoofing" is not used for control of either the sequence interval of transmission of two or more frames or 20 MHz operation and 40 MHz operation.

FIG. 6 is an explanatory diagram showing a "Channel Management" method in a prior art radio LAN system.

In FIG. 6, an example of using two channels is shown, and CH_a (Control) is a fundamental channel and CH_b (Extension) is an extended channel.

Assume that a radio communication terminal L-STA and a radio communication terminal HT-STA can run using only the channel CH_a (for example, a radio communication terminal L-STA and a radio communication terminal HT-STA in another BSS (i.e., a network which another access point creates) can run using only the channel CH_b), and a radio communication terminal HT-MC-STA can run using both the channel CH_a and the channel CH_b. For the sake of simplicity, the example in which the radio communication terminal L-STA and the radio communication terminal HT-STA can run using only the channel CH_a, and the radio communication terminal L-STA and the radio communication terminal HT-STA in the other BSS can run using only the channel CH_b will be shown. However, another example can be provided, and, for example, there can be various combinations of overlaps, such as a combination of a radio communication terminal L-STA and a radio communication terminal HT-STA, as shown in FIG. 10.

Because each of the channels CH_a and CH_b has a bandwidth of 20 MHz, each terminal performs a 20 MHz-bandwidth operation in a case of using the single channel CH_a or CH_b, whereas in a case of using both the channels CH_a and CH_b simultaneously, each terminal performs a 40 MHz-bandwidth operation.

For example, when a terminal control apparatus which is an access point prohibits data transmission by each of the radio communication terminal L-STA and the radio communication terminal HT-STA so as to enable the radio communication terminal HT-MC-STA to carry out data transmission with 40 MHz bandwidth, the terminal control apparatus carries out carrier sense CS of the channel CH_a, and, if the channel CH_a is being not used, generates radio data including transmission prohibit information for instructing prohibition of data transmission and transmits the radio data to both the radio communication terminal L-STA and the radio communication terminal HT-STA by using the channel CH_a.

FIG. 6 shows an example in which radio data are transmitted in the form of BCN (Beacon) or ICB (Increase Channel Band) frames. Because ICB frames are frames which are defined newly in order for a terminal control apparatus to carry out "Channel Management" with 20 MHz bandwidth and "Channel Management" with 40 MHz bandwidth, the existing radio communication terminal L-STA may not recognize ICB frames which are defined newly, and may not read the transmission prohibit information for instructing prohibition of data transmission.

If each of the radio communication terminal L-STA and the radio communication terminal HT-STA receives the radio data transmitted from the terminal control apparatus, and can read the transmission prohibit information included in the radio data, each of the radio communication terminal L-STA and the radio communication terminal HT-STA sets up virtual carrier sense information which is called NAV, and suspends data transmission which uses the channel CH_a during a predetermined time interval.

Next, when the channel CH_a and the channel CH_b are running independently, and the channel CH_b is being used (busy state) because of interference from another BSS or the like, the terminal control apparatus waits until the channel CH_b is released, carries out carrier sense CS of the channel CH_b, and, if it can check to see that the channel CH_b is being not used, transmits radio data including transmission prohibition information to both the radio communication terminal L-STA and the communication terminal HT-STA in the other BSS by using the channel CH_b.

FIG. 6 shows an example in which radio data are transmitted in the form of CTS (CTS-to-myself) or BCN (Beacon) frames.

When each of the radio communication terminal L-STA and the radio communication terminal HT-STA in the other BSS receives the radio data transmitted from the terminal control apparatus, and reads transmission prohibition information included in the radio data, it sets up NAV and suspends the data transmission using the channel CH_b during a predetermined time interval.

After the terminal control apparatus has prohibited the use of the channel CH_a or CH_b by each of the radio communication terminal L-STA and the radio communication terminal HT-STA in the above-mentioned way, it transmits radio data including prohibition release information for releasing the prohibition of the transmission to the radio communication terminal HT-MC-STA by using the channels CH_a and CH_b in order to release the prohibition of the data transmission by the radio communication terminal HT-MC-STA.

FIG. 6 shows an example in which radio data are transmitted in the form of CF-END frames.

When the radio communication terminal HT-MC-STA receives the radio data transmitted from the terminal control apparatus and then reads the prohibition release information included in the radio data, it releases the NAV, shifts to a state in which it can carry out communications, and then starts data transmission with 40 MHz bandwidth by using the channels CH_a and CH_b.

Next, in a case of prohibiting the data transmission by the radio communication terminal HT-MC-STA and then enabling each of the radio communication terminal L-STA and the radio communication terminal HT-STA to carry out data transmission with 20 MHz bandwidth, the terminal control apparatus transmits radio data containing transmission prohibition information to the radio communication terminal HT-MC-STA by using the channels CH_a and CH_b.

FIG. 6 shows an example in which radio data are transmitted in the form of DCB (Decrease Channel Band) frames. Because DCB frames are frames which are defined newly in order to carry out "Channel Management" with 20 MHz bandwidth and "Channel Management" with 40 MHz bandwidth, the existing radio communication terminal L-STA cannot recognize DCB frames which are defined newly. Furthermore, when frames are transmitted at a frequency band of 40 MHz, the radio communication terminal HT-STA cannot recognize the frames in the data region. However, the radio communication terminal HT-STA can recognize fields including up to the HT-SIG.

When the radio communication terminal HT-MC-STA receives the radio data transmitted from the terminal control apparatus and then reads the transmission prohibition information included in the radio data, it sets up NAV and suspends the data transmission using the channels CH_a and CH_b during a predetermined time interval.

After the terminal control apparatus has prohibited the use of the channels CH_a and CH_b by the radio communication terminal HT-MC-STA in the above-mentioned way, it transmits radio data including prohibition release information for releasing the prohibition of the transmission to both the radio communication terminal L-STA and the radio communication terminal HT-STA in the other BSS by using the channel CH_b in order to release the prohibition of the data transmission by each of the radio communication terminal L-STA and the radio communication terminal HT-STA in the other BSS.

FIG. 6 shows an example in which radio data are transmitted in the form of CF-END frames.

When each of the radio communication terminal L-STA and the radio communication terminal HT-STA in the other BSS receives the radio data transmitted from the terminal control apparatus, and then reads the prohibition release information included in the radio data, it releases the NAV, shifts to a state which it can carry out communications, and starts data transmission with 20 MHz bandwidth by using the channel CH_b.

The terminal control apparatus also transmits radio data including prohibition release information for releasing the prohibition of the transmission to both the radio communication terminal L-STA and the radio communication terminal HT-STA which the terminal control apparatus manages by using the channel CH_a in order to release the prohibition of the data transmission by each of the radio communication terminal L-STA and the radio communication terminal HT-STA.

FIG. 6 shows an example in which radio data are transmitted in the form of CF-END frames.

When each of the radio communication terminal L-STA and the radio communication terminal HT-STA receives the radio data transmitted from the terminal control apparatus and then reads the prohibition release information included in the radio data, it releases the NAV, shifts to a state which it can carry out communications, and starts data transmission with 20 MHz bandwidth by using the channel CH_a.

[Nonpatent reference 1] IEEE802.11 Standard, HyperLAN2 Standard

[Nonpatent reference 2] IEEE802.11e-Draft 13.0

A problem with the prior art radio LAN system which is so constructed as mentioned above is that when transmission prohibition information for instructing prohibition of data transmission is transmitted in the form of ICB frames which are defined newly in order for the terminal control apparatus to carry out "Channel Management" with 20 MHz bandwidth and "Channel Management" with 40 MHz bandwidth, the existing radio communication terminal L-STA cannot recognize ICB frames which are defined newly, and therefore cannot read the transmission prohibition information for instructing the prohibition of data transmission.

Another problem is that in order for the terminal control apparatus to carry out "Channel Management" with 20 MHz bandwidth and "Channel Management" with 40 MHz bandwidth, the terminal control apparatus must transmit a large volume of radio data to the radio communication terminal (in the example of FIG. 6, the terminal control apparatus transmits radio data six times), and therefore the overhead of channel switching becomes large.

A further problem is that the radio communication terminal HT-MC-STA can recognize the prohibition and release of 40 MHz-bandwidth data transmission if receiving radio data transmitted from the terminal control apparatus, whereas it cannot check to see whether or not the prohibition of 20 MHz-bandwidth data transmission is released, and therefore cannot switch between the 40 MHz-bandwidth data transmission and the 20 MHz-bandwidth data transmission.

The present invention is made in order to solve the above-mentioned problems, and it is therefore an object of the present invention to provide a terminal control apparatus which can prevent an existing radio communication terminal L-STA from entering a state in which it cannot recognize control information and can also reduce the overhead of channel switching, and a radio LAN system.

It is another object of the present invention to provide a terminal control apparatus which can enable a radio communication terminal HT-MC-STA to carry out not only data transmission with 40 MHz bandwidth but data transmission with 20 MHz bandwidth, and a radio LAN system.

DISCLOSURE OF THE INVENTION

In accordance with the present invention, there is provided a terminal control apparatus which when prohibiting data transmission by a first radio communication terminal, generates radio data including information about a data transmission prohibition time interval during which the data transmission is prohibited in a header region which the first radio communication terminal and a second radio communication terminal can recognize in common, and for, when a use state checking means has checked to see that a channel is being not used, transmitting radio data to the first radio communication terminal in a form of frames which the first radio communication terminal can recognize by using the single channel, and, when prohibiting data transmission by the second radio communication terminal, generates radio data including information about a time interval during which the data transmission is prohibited in a data region, and transmits the radio data to the second radio communication terminal by using two or more channels containing the single channel.

As mentioned above, in accordance with the present invention, the terminal control apparatus is so constructed as to, when prohibiting data transmission by the first radio communication terminal, generates radio data including information about a data transmission prohibition time interval during which the data transmission is prohibited in a header region which the first and second radio communication terminals can recognize in common, and for, when the use state checking means has checked to see that the channel is being not used, transmitting radio data to the first radio communication terminal in the form of frames which the first radio communication terminal can recognize by using the single channel, and, when prohibiting data transmission by the second radio communication terminal, generates radio data including information about a time interval during which the data transmission is prohibited in a data region, and transmits the radio data to the second radio communication terminal by using two or more channels containing the single channel. Therefore, the present invention offers an advantage of being able to prevent the first radio communication terminal from entering a state in which it cannot recognize control information and being also able to reduce the overhead of channel switching.

BRIEF DESCRIPTION OF THE FIGURES

FIG. 10 is an explanatory diagram showing a combination of overlaps.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
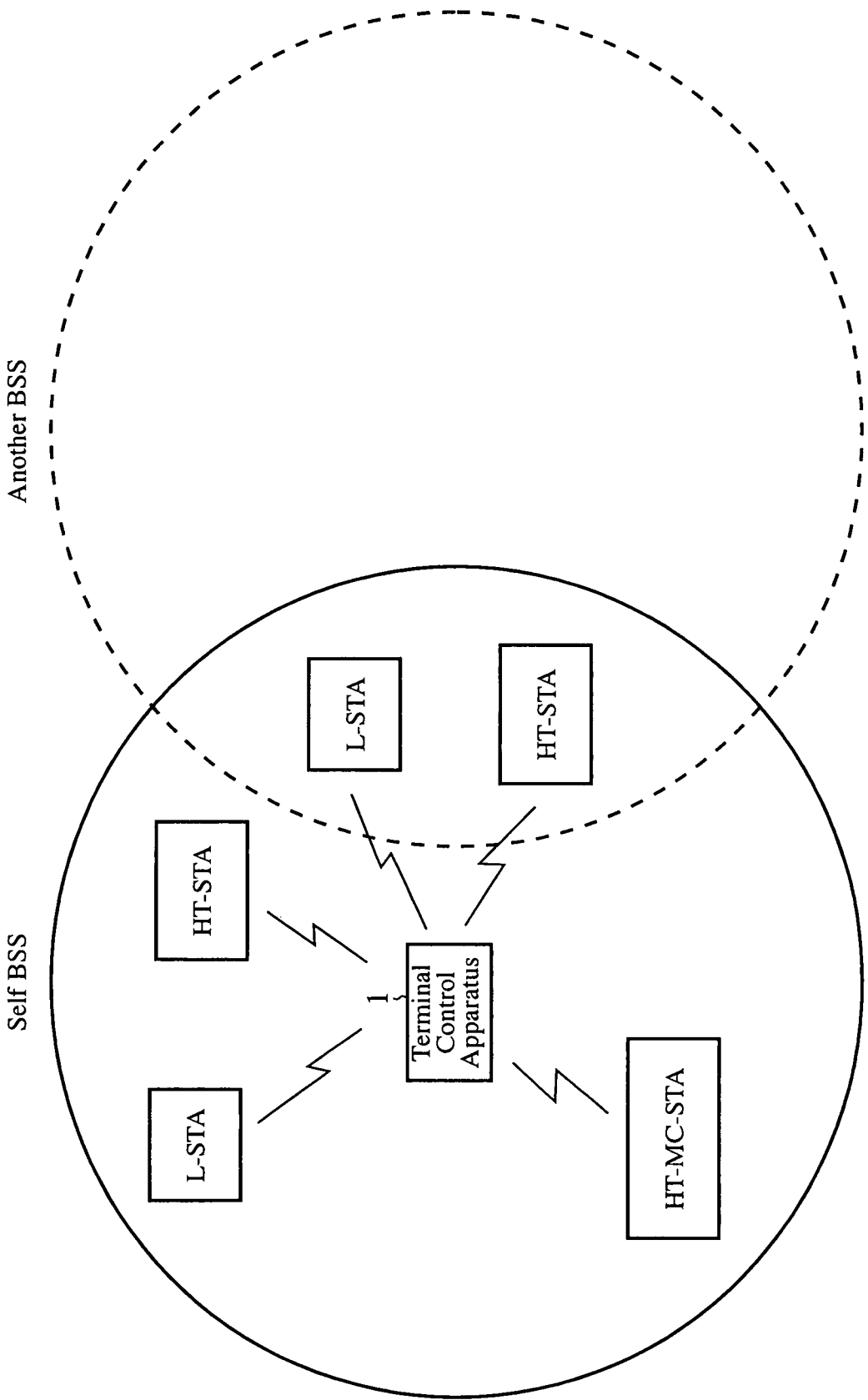
FIG. 1 is a block diagram showing a radio LAN system in accordance with embodiment 1 of the present invention.

FIG. 1 is a block diagram showing a radio LAN system in accordance with embodiment 1 of the present invention. In the figure, a radio communication terminal L-STA is a first radio communication terminal which carries out radio communications by using a channel CH_a of a frequency band of 20 Hz.

A radio communication terminal HT-STA is a first radio communication terminal which carries out high-speed transmission such as MIMO by using the channel CH_a.

A radio communication terminal HT-MC-STA is a second radio communication terminal which can carry out high-speed radio communications, such as MIMO, by using the channel CH_a and a CH_b (i.e., a channel of a frequency band of 40 Hz), and which can carry out radio communications by using either the channel CH_a or the channel CH_b.

A terminal control apparatus 1 carries out a process of controlling the radio communications by each of the radio communication terminal L-STA, the radio communication terminal HT-STA, and the radio communication terminal HT-MC-STA which are connected to one another via a radio LAN.

In this embodiment 1, the example in which the terminal control apparatus 1 is disposed separately from the radio communication terminal L-STA, the radio communication terminal HT-STA, and the radio communication terminal HT-MC-STA is explained. As an alternative, the radio communication terminal L-STA, the radio communication terminal HT-STA, and the radio communication terminal HT-MC-STA can serve as the functions of the terminal control apparatus 1.

Figure 2:
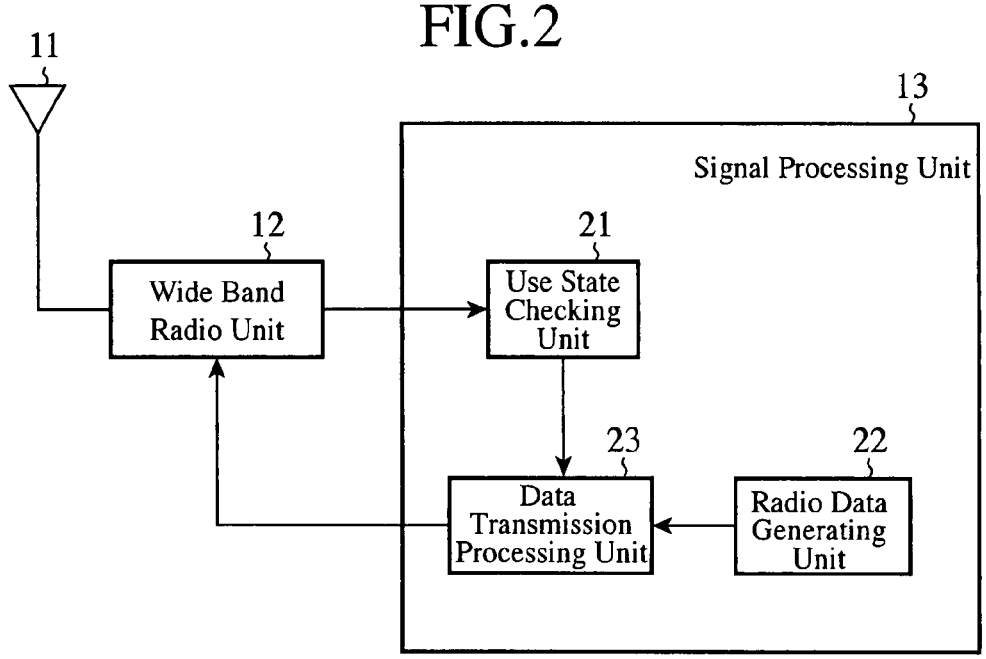
FIG. 2 is a block diagram showing a terminal control apparatus 1 of the radio LAN system in accordance with embodiment 1 of the present invention.

FIG. 2 is a block diagram showing the terminal control apparatus 1 of the radio LAN system in accordance with embodiment 1 of the present invention. In the figure, a wide band radio unit 12 is connected to an antenna 11, and emits radio data outputted from a signal processing unit 13 in the air from the antenna 11 while performing a process of transmitting radio data received by the antenna 11 to the signal processing unit 13 and so on. In a case in which each of the radio communication terminal HT-STA and the radio communication terminal HT-MC-STA carries out high-speed radio communications using a technology of MIMO, two or more antennas 11 are connected to the wide band radio unit 12.

A use state checking unit 21 of the signal processing unit 13 carries out a process of checking the use state of the channel CH_a by controlling the wide band radio unit 12 so as to carry out carrier sense SC when prohibiting the data transmission each of by the radio communication terminal L-STA and the radio communication terminal HT-STA.

A use state checking means comprises the wide band radio unit 12 and the use state checking unit 21.

When prohibiting the data transmission by each of the radio communication terminal L-STA and the radio communication terminal HT-STA, a radio data generating unit 22 of the signal processing unit 13 carries out a process of generating, as information about a data transmission prohibition time interval, radio data containing a modulation method (Rate) and a data length (Length), and incorporates the radio data in an L-SIG which is a header region which the radio communication terminal L-STA, the radio communication terminal HT-STA, and the radio communication terminal HT-MC-STA can recognize in common. When prohibiting the data transmission by the radio communication terminal HT-MC-STA, the radio data generating unit carries out a process of generating, as information about a data transmission prohibition time interval, radio data containing single-channel-use permission information indicating permission to use either the channel CH_a or the channel CH_b, and incorporates the radio data in an L-SERVICE field in the data region or a field, such as a Reserved Bit of the L-SIG or an HT-SIG, which can be recognized by both the radio communication terminal HT-STA and the radio communication terminal HT-MC-STA.

When prohibiting the data transmission by each of the radio communication terminal L-STA and the radio communication terminal HT-STA, if the use state checking unit 21 has checked that the channel CH_a is being not used, a data transmission processing unit 23 of the signal processing unit 13 carries out a process of transmitting the radio data generated by the radio data generating unit 22 in the form of frames which can be recognized by the radio communication terminal L-STA and the radio communication terminal HT-STA to both the radio communication terminal L-STA and the radio communication terminal HT-STA by using the channel CH_a. When prohibiting the data transmission by the radio communication terminal HT-MC-STA, the data transmission processing unit carries out a process of transmitting the radio data generated by the radio data generating unit 22 to the radio communication terminal HT-MC-STA by using the channels CH_a and CH_b.

First and the second radio data transmission means comprise the wide band radio unit 12, the radio data generating unit 22, and the data transmission processing unit 23.

Next, the operation of the radio LAN system in accordance with this embodiment of the present invention will be explained.

Figure 7:
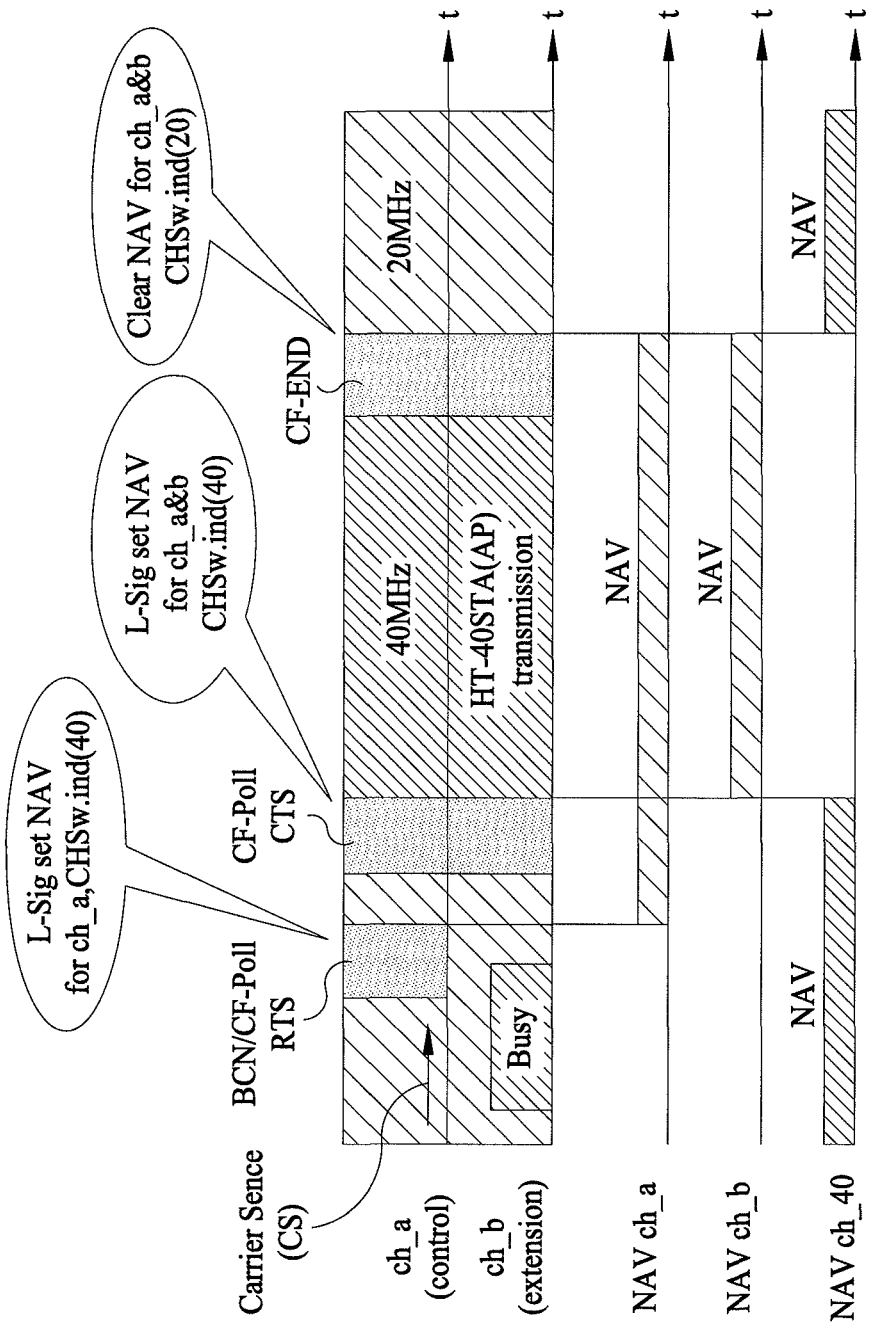
FIG. 7 is an explanatory diagram showing a "Channel Management" method which the radio LAN system in accordance with embodiment 1 of the present invention uses.

FIG. 7 is an explanatory diagram showing a "Channel Management" method which the radio LAN system in accordance with embodiment 1 of the present invention uses.

In FIG. 7, an example in which the two channels are used is shown, and the CH_a (Control) is a fundamental channel and the CH_b (Extension) is an extended channel.

Assume that each of the radio communication terminal L-STA and the radio communication terminal HT-STA which the terminal control apparatus 1 manages can run by using only the channel CH_a (for example, each of the radio communication terminal L-STA and the radio communication terminal HT-STA in the other BSS (i.e., a network which another access point creates) can run by using only the channel CH_b), and the radio communication terminal HT-MC-STA can run by using both the channel CH_a and the channel CH_b. For the sake of simplicity, the example in which each of the radio communication terminal L-STA and the radio communication terminal HT-STA can run by using only the channel CH_a, and each of the radio communication terminal L-STA and the radio communication terminal HT-STA in the other BSS can run by using only the channel CH_b will be shown. However, another example can be provided, and, for example, there can be various combinations of overlaps, such as a combination of a radio communication terminal L-STA and a radio communication terminal HT-STA, as shown in FIG. 10.

Because each of the channels CH_a and CH_b has a bandwidth of 20 MHz, each terminal performs a 20 MHz-bandwidth operation in a case of using the single channel CH_a or CH_b, whereas in a case of using both the channels CH_a and channel CH_b simultaneously, each terminal performs a 40 MHz-bandwidth operation.

For example, when the terminal control apparatus 1 which is an access point prohibits the data transmission by each of the radio communication terminal L-STA and the radio communication terminal HT-STA which the terminal control apparatus manages so as to enable the radio communication terminal HT-MC-STA to carry out data transmission with 40 MHz bandwidth, the terminal control apparatus carries out carrier sense CS of the channel CH_a, and, if the channel CH_a is being not used, generates radio data including information about a data transmission prohibition time interval and transmits the radio data to both the radio communication terminal L-STA and the radio communication terminal HT-STA by using the channel CH_a.

More specifically, when prohibiting the data transmission by each of the radio communication terminal L-STA and the radio communication terminal HT-STA, the use state checking unit 21 of the signal processing unit 13 in the terminal control apparatus 1 carries out a process of checking the use state of the channel CH_a by controlling the wide band radio unit 12 so as to carry out carrier sense SC.

Figure 3:
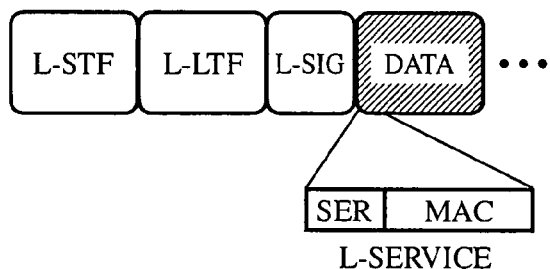
FIG. 3 is an explanatory diagram showing a frame format of a radio communication terminal L-STA.
Figure 4:
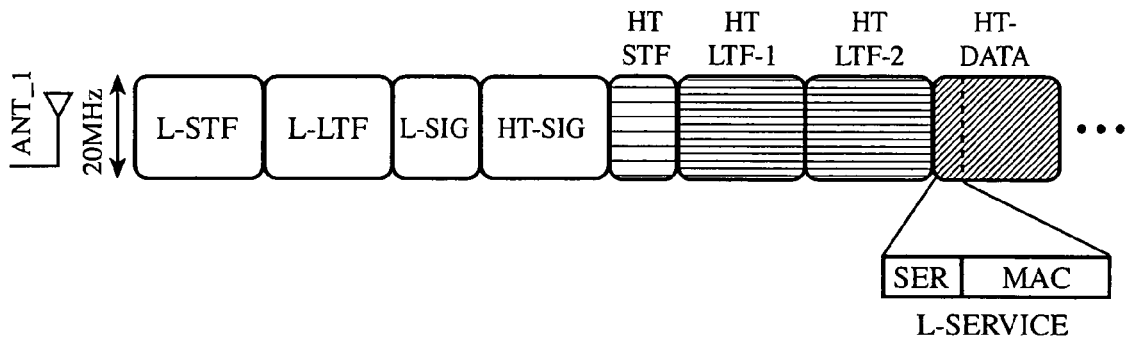
FIG. 4 is an explanatory diagram showing a frame format of a radio communication terminal HT-STA.

The radio data generating unit 22 of the signal processing unit 13 generates, as information about a data transmission prohibition time interval, radio data containing the modulation method (Rate) and the data length (Length), and incorporates the radio data in the L-SIG field (see FIGS. 3 to 5) which is a header region which the radio communication terminal L-STA, the radio communication terminal HT-STA, and the radio communication terminal HT-MC-STA can recognize in common.

The radio data generating unit 22 uses a technology which is referred to as "Spoofing", and determines the modulation method (Rate) and the data length (Length) so that the data transmission prohibition time interval which can be calculated from the modulation method (Rate) and the data length (Length) becomes equal to a transmission time interval during which CF-END frames are transmitted when releasing the prohibition of the data transmission.

If the use state checking unit 21 has checked that the channel CH_a is being not used, the data transmission processing unit 23 of the signal processing unit 13 transmits the radio data generated by the radio data generating unit 22 in the form of frames which the radio communication terminal L-STA and radio communication terminal HT-STA can recognize to both the radio communication terminal L-STA and radio communication terminal HT-STA by using the channel CH_a.

More specifically, the data transmission processing unit 23 modulates the radio data generated by the radio data generating unit 22, and transmits the modulated radio data to the wide band radio unit 12. The wide band radio unit 12 transmits the radio data to both the radio communication terminal L-STA and the radio communication terminal HT-STA by emitting the modulated signal of the radio data in the air from the antenna 11 by using the channel CH_a according to an instruction from the data transmission processing unit 23.

FIG. 7 shows an example in which the radio data are transmitted in the form of BCN (Beacon), CF-Poll, or RTS frames. As an alternative, the radio data can be transmitted in the form of another type of frames as long as they are frames which both the radio communication terminal L-STA and the radio communication terminal HT-STA can recognize.

When receiving the radio data transmitted from the terminal control apparatus 1, each of the radio communication terminal L-STA and the radio communication terminal HT-STA extracts the modulation method (Rate) and the data length (Length) from the L-SIG which is the header region of the radio data, calculates a data transmission prohibition time interval from the modulation method (Rate) and the data length (Length), and sets up virtual carrier sense information which is called NAV and prohibits the data transmission using the channel CH_a during the data transmission prohibition time interval. As an alternative, each of the radio communication terminal L-STA and the radio communication terminal HT-STA sets up NAV on the basis of information on the Duration field in the MAC. In a case in which each of the radio communication terminal L-STA and the radio communication terminal HT-STA carries out communications by using the channel CH_a after the transmission of the above-mentioned frame because each of them cannot receive the above-mentioned frame, when carrying out communications by using the channel CH_a, the terminal control apparatus can ensure the transmission of the transmission prohibition instruction to a terminal having a bad receiving environment by retransmitting the above-mentioned frame before transmitting the next frame.

Next, when the channel CH_a and the channel CH_b are running independently, and the channel CH_b is being used (busy state) because of interference from the other BSS or the like, the terminal control apparatus 1 waits until the channel CH_b is released, carries out carrier sense CS of the channel CH_b, and, if it can check to see that the channel CH_b is being not used, transmits radio data including transmission prohibition information to both the radio communication terminal L-STA and the communication terminal HT-STA in the other BSS by using the channel CH_b.

More specifically, the use state checking unit 21 of the signal processing unit 13 in the terminal control apparatus 1 carries out a process of checking the use state of the channel CH_b by controlling the wide band radio unit 12 so as to carry out carrier sense CS.

The radio data generating unit 22 of the signal processing unit 13 generates, as information about a data transmission prohibition time interval, radio data containing the modulation method (Rate) and the data length (Length), and incorporates the radio data in the L-SIG field (see FIGS. 3 to 5), as in the case of prohibiting the data transmission using the channel CH_a.

When generating the radio data containing the modulation method (Rate) and the data length (Length), the radio data generating unit 2 incorporates multiple-channels-use permission information CHSw.ind(40) indicating permission to use the channels CH_a and CH_b in either the L-SERVICE field which is the data region of the radio data or a field, such as the Reserved Bit of the L-SIG or HT-SIG, which can be recognized by both the radio communication terminal HT-STA and the radio communication terminal HT-MC-STA in order to permit radio communications with 40 MHz bandwidth by the radio communication terminal HT-MC-STA at the same time when prohibiting the use of the channel CH_a or CH_b by each of the radio communication terminal L-STA and the radio communication terminal HT-STA.

In accordance with the U.S. radio LAN standard IEEE802.11, because it is defined that the L-SERVICE field is a field of 16 bits and NULL is set to [0:6] bits of the L-SERVICE, 9 bits of [7:15] are reserved bits. For example, 2 bits of the 9-bit reserved are used so as to include the multiple-channels-use permission information CHSw.ind (40).

Figures 5, 9:
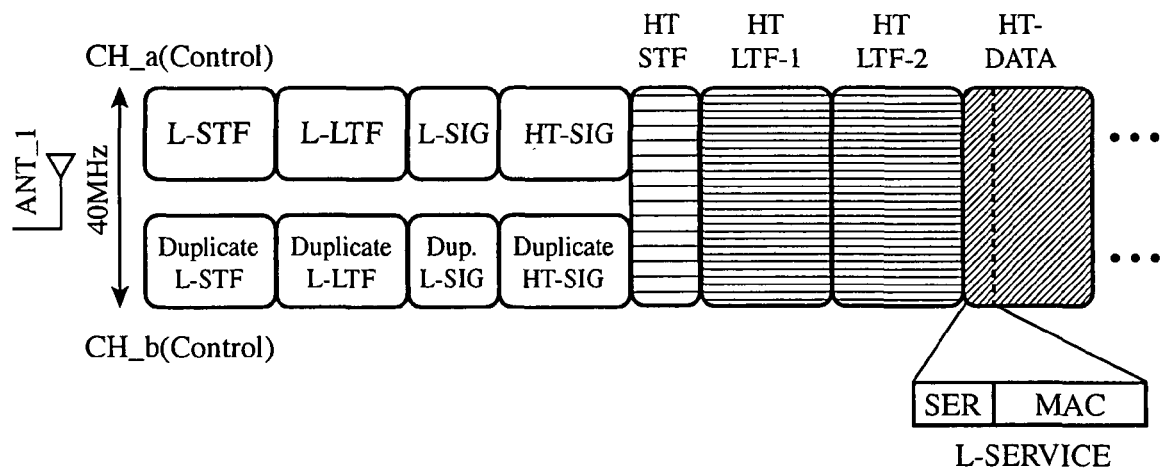
FIG. 5 is an explanatory diagram showing a frame format of a radio communication terminal HT-MC-STA.
FIG. 9 is an explanatory diagram showing the contents stored in an L-SERVICE field.
Figure 6:
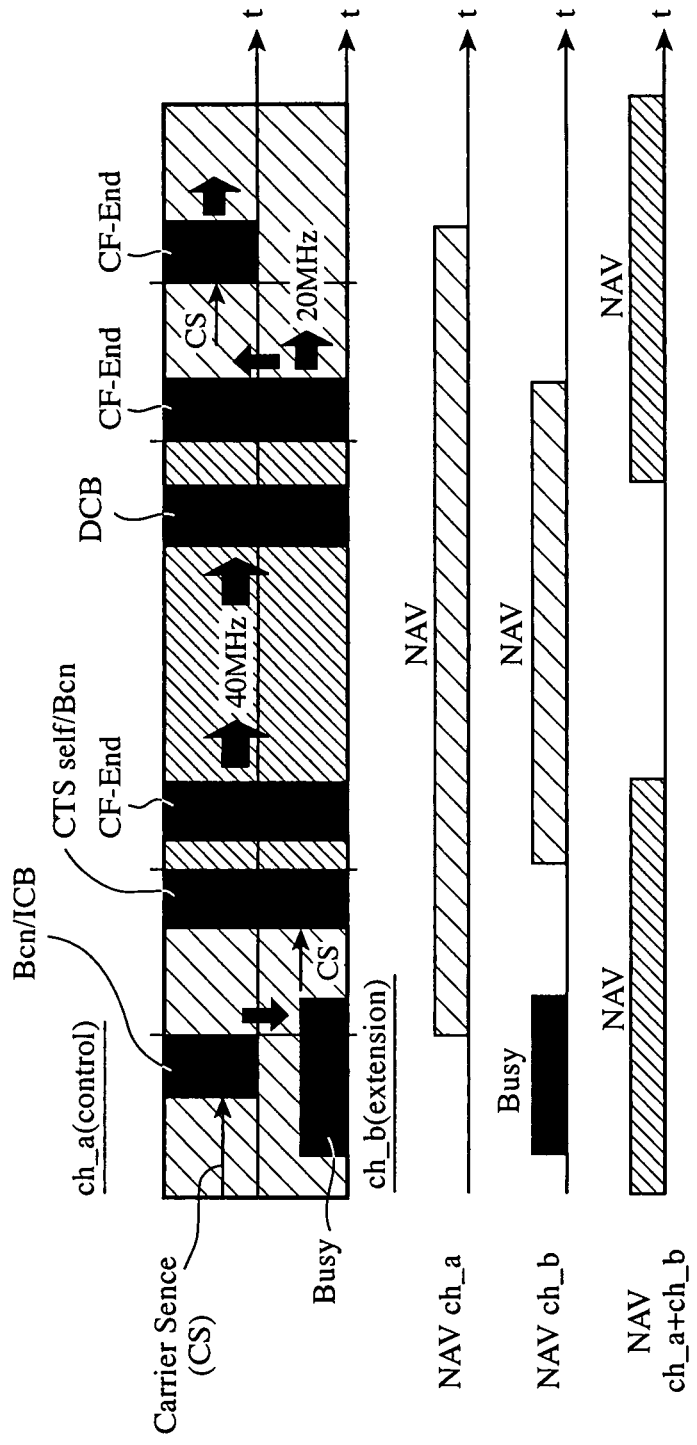
FIG. 6 is an explanatory diagram showing a "Channel Management" method which a prior art radio LAN system uses.

FIG. 9 is an explanatory diagram showing the contents stored in the L-SERVICE field, and the example of FIG. 9 shows that when #8 is "1" and #9 is "0", the multiple-channels-use permission information CHSw.ind(40) is included.

In the above-mentioned example, the multiple-channels-use permission information CHSw.ind(40) is included in the reserve bits of the L-SERVICE field. The present embodiment is not limited to this example. As an alternative, the multiple-channels-use permission information CHSw.ind (40) can be included in other bits which are not used.

If the use state checking unit 21 has checked that the channel CH_b is being not used, the data transmission processing unit 23 of the signal processing unit 13 transmits the radio data generated by the radio data generating unit 22 to both the radio communication terminal L-STA and the radio communication terminal HT-STA in the other BSS by using the channels CH_a and CH_b, and also transmits the radio data to the radio communication terminal HT-MC-STA.

More specifically, the data transmission processing unit 23 modulates the radio data generated by the radio data generating unit 22, and outputs the modulated radio data to the wide band radio unit 12. By emitting the modulated signal of the radio data in the air from the antenna 11 by using the channels CH_a and CH_b according to an instruction from the data transmission processing unit 23, the wide band radio unit 12 transmits the radio data to both the radio communication terminal L-STA and the radio communication terminal HT-STA, and also transmits the radio data to the radio communication terminal HT-MC-STA.

FIG. 7 shows an example in which the radio data are transmitted at a frequency band of 40 Hz and in the form of CF-Poll or CTS-to-myself frames. As an alternative, the radio data can be transmitted in the form of another type of frames as long as they are frames which the radio communication terminal L-STA, the radio communication terminal HT-STA and the radio communication terminal HT-MC-STA can recognize.

When receiving the radio data transmitted from the terminal control apparatus 1, each of the radio communication terminal L-STA and the radio communication terminal HT-STA in the other BSS extracts the modulation method (Rate) and the data length (Length) from the L-SIG which is the header region of the radio data, calculates a data transmission prohibition time interval from the modulation method (Rate) and the data length (Length), and sets up virtual carrier sense information which is called NAV and prohibits the data transmission using the channel CH_b during the data transmission prohibition time interval.

When receiving the radio data transmitted from the terminal control apparatus 1, the radio communication terminal HT-MC-STA extract the multiple-channels-use permission information CHSw.ind(40) from the L-SERVICE which is the data region of the radio data.

When extracting the multiple-channels-use permission information CHSw.ind(40), the radio communication terminal HT-MC-STA recognizes that radio communications with 40 MHz bandwidth are permitted, releases the NAV, and, after that, uses the channels CH_a and CH_b to start data transmission with 40 MHz bandwidth.

Next, in a case of prohibiting the data transmission by the radio communication terminal HT-MC-STA and then enabling each of the radio communication terminal L-STA and the radio communication terminal HT-STA to carry out data transmission with 20 MHz bandwidth, the terminal control apparatus 1 transmits radio data including information about the prohibition of the data transmission in the Duration field in the MAC header which is the data region to the radio communication terminal HT-MC-STA by using the channels CH_a and CH_b, and also transmits radio data including information about release of the prohibition of the data transmission in the L-SIG which is the header region to both the radio communication terminal L-STA and the radio communication terminal HT-STA.

More specifically, the radio data generating unit 22 of the terminal control apparatus 1 generates, as information about the prohibition of the data transmission, radio data containing single-channel-use permission information CHSw.ind(20) indicating permission to use the single channel CH_a or CH_b in the L-SERVICE field which is the data region in order to prohibit the radio communication terminal HT-MC-STA from carrying out radio communications with 40 MHz bandwidth and to permit the radio communication terminal HT-MC-STA to carry out radio communications with 20 MHz bandwidth.

The example of FIG. 9 shows that when #8 is "0" and #9 is "1", the single-channel-use permission information CHSw.ind(20) is included.

In the above-mentioned example, the single-channel-use permission information CHSw.ind(20) is included in the reserve bits of the L-SERVICE field. The present embodiment is not limited to this example. As an alternative, the single-channel-use permission information CHSw.ind(20) can be included in other bits which are not used.

When generating radio data containing the single-channel-use permission information CHSw.ind(20), the radio data generating unit 22 incorporates prohibition time interval information NAVch_40 indicating a data transmission prohibition time interval in the Duration field in the data region of the radio data.

The radio data generating unit 22 uses a technology which is called "Spoofing", and determines the prohibition time interval information NAVch_40 so that the data transmission prohibition time interval indicated by the prohibition time interval information NAVch_40 becomes equal to a transmission time interval during which a CF-Poll or CTS-to-myself frame is transmitted when releasing the prohibition of the data transmission.

In the above-mentioned example, the prohibition time interval information NAVch_40 is incorporated in the Duration field. The present embodiment is not limited to this example. The prohibition time interval information NAVch_40 can be incorporated in other bits which are not used.

The radio data generating unit 22 incorporates, as information about the release of the prohibition of the data transmission, a set of the modulation method (Rate) and the data length (Length) showing that the length of the data transmission prohibition time interval is zero in the L-SIG which is the header region of the radio data in order to release the prohibition of data transmission with 20 MHz bandwidth by each of the radio communication terminal L-STA and the radio communication terminal HT-STA.

The data transmission processing unit 23 of the signal processing unit 13 transmits the radio data generated by the radio data generating unit 22 to the radio communication terminal HT-MC-STA by using the channels CH_a and CH_b, and also transmits the radio data to both the radio communication terminal L-STA and the radio communication terminal HT-STA.

More specifically, the data transmission processing unit 23 modulates the radio data generated by the radio data generating unit 22, and outputs the modulated radio data to the wide band radio unit 12. By emitting the modulated signal of the radio data in the air from the antenna 11 by using the channels CH_a and CH_b according to an instruction from the data transmission processing unit 23, the wide band radio unit 12 transmits the radio data to the radio communication terminal HT-MC-STA, the radio communication terminal L-STA and the radio communication terminal HT-STA.

When receiving the radio data transmitted from the terminal control apparatus 1, the radio communication terminal HT-MC-STA extracts the single-channel-use permission information CHSw.ind(20) from the L-SERVICE which is the data region of the radio data.

When extracting the single-channel-use permission information CHSw.ind(20), the radio communication terminal HT-MC-STA recognizes that radio communications with 40 MHz bandwidth are prohibited and radio communications with 20 MHz bandwidth are permitted.

As a result, the radio communication terminal HT-MC-STA sets up NAV and then prohibits itself from carrying out data transmission with 40 MHz bandwidth using the channels CH_a and CH_b, but, after that, starts data transmission with 20 MHz bandwidth using either the channel CH_a or the channel CH_b because radio communications with 20 MHz bandwidth are permitted.

When receiving the radio data transmitted from the terminal control apparatus 1, each of the radio communication terminal L-STA and the radio communication terminal HT-STA extracts the modulation method (Rate) and the data length (Length) from the L-SIG which is the header region of the radio data, recognizes that the prohibition of the data transmission is released from the modulation method (Rate) and the data length (Length), and, after that, starts data transmission with 20 MHz bandwidth by using the channel CH_a (each of the radio communication terminal L-STA and the radio communication terminal HT-STA in the other BSS uses the channel CH_b).

FIG. 7 shows an example in which the radio data are transmitted at a frequency band of 40 Hz and in the form of CF-END frames. Needless to say, the radio data can be alternatively transmitted in the form of another type of frames as long as they are frames which the radio communication terminal L-STA, the radio communication terminal HT-STA and the radio communication terminal HT-MC-STA can recognize.

As can be seen from the above description, in accordance with this embodiment 1, when prohibiting data transmission by each of the radio communication terminal L-STA and the radio communication terminal HT-STA, the terminal control apparatus generates radio data including information about a data transmission prohibition time interval in the L-SIG which is the header region of the radio data which the radio communication terminal L-STA, the radio communication terminal HT-STA, and the radio communication terminal HT-MC-STA can recognize in common, and, if the use state checking unit 21 has checked to see that the channel CH_a is being not used, transmits the radio data to both the radio communication terminal L-STA and the radio communication terminal HT-STA in the form of frames which the radio communication terminal L-STA and the radio communication terminal HT-STA can recognize by using the channel CH_a. Furthermore, when prohibiting the data transmission by the radio communication terminal HT-MC-STA, the terminal control apparatus generates radio data including information about a data transmission prohibition time interval in the L-SERVICE which is the data region of the radio data, and transmits the radio data to the radio communication terminal HT-MC-STA by using the channels CH_a and CH_b. Therefore, the terminal control apparatus 1 can prevent each of the radio communication terminal L-STA and the radio communication terminal HT-STA from entering a state in which each of them cannot recognize the information about the data transmission prohibition time interval, and can also reduce the overhead of the channel switching thereby.

More specifically, in accordance with this embodiment 1, in order to carry out "Channel Management" with 20 MHz bandwidth and "Channel Management" with 40 MHz bandwidth, the terminal control apparatus transmits the radio data containing, as the information about the data transmission prohibition time interval, the modulation method (Rate) and the data length (Length) in the L-SIG field in the form of frames which can be recognized by the existing radio communication terminal L-STA (for example, BCN, CF-Poll, or RTS frames), instead of ICB frames which are defined newly. Therefore, the terminal control apparatus can prevent each of the radio communication terminal L-STA and the radio communication terminal HT-STA from entering a state in which each of them cannot recognize the information about the data transmission prohibition time interval.

In addition, in accordance with this embodiment 1, even when the terminal control apparatus 1 carries out "Channel Management" with 20 MHz bandwidth and "Channel Management" with 40 MHz bandwidth, because it can switch between channels without transmitting a large volume of radio data to the radio communication terminal (in the example of FIG. 7, the terminal control apparatus 1 transmits radio data only three times), the terminal control apparatus 1 can reduce the overhead of switching between channels.

Furthermore, in accordance with this embodiment 1, the radio data generating unit 22 incorporates either single-channel-use permission information CHSw.ind(20) or multiple-channels-use permission information CHSw.ind(40) in the L-SERVICE which is the data region of the radio data. Therefore, the radio communication terminal HT-MC-STA can carry out not only data transmission with 40 MHz bandwidth but data transmission with 20 MHz bandwidth.

Embodiment 2

In accordance with above-mentioned embodiment 1, the radio data generating unit 22 uses a technology which is referred to as "Spoofing" so as to determine the modulation method (Rate) and the data length (Length) so that a data transmission prohibition time interval which can be calculated from the modulation method (Rate) and the data length (Length) becomes equal to a transmission time interval during which CF-END frames are transmitted when releasing the prohibition of the data transmission, as previously shown. In a case in which the data transmission prohibition time interval becomes long, the data transmission prohibition time interval may exceed a maximum prohibition time interval which can be set to the L-SIG field.

The terminal control apparatus in accordance with this embodiment 2 is therefore so constructed that, when the data transmission prohibition time interval exceeds the maximum prohibition time interval which can be set to the L-SIG field, the radio data generating unit 22 generates radio data a number of times, and the data transmission processing unit 23 transmits radio data to both the radio communication terminal L-STA and the radio communication terminal HT-STA a number of times so as to update the data transmission prohibition time interval.

Concretely, the terminal control apparatus operates as follows.

Figure 8:
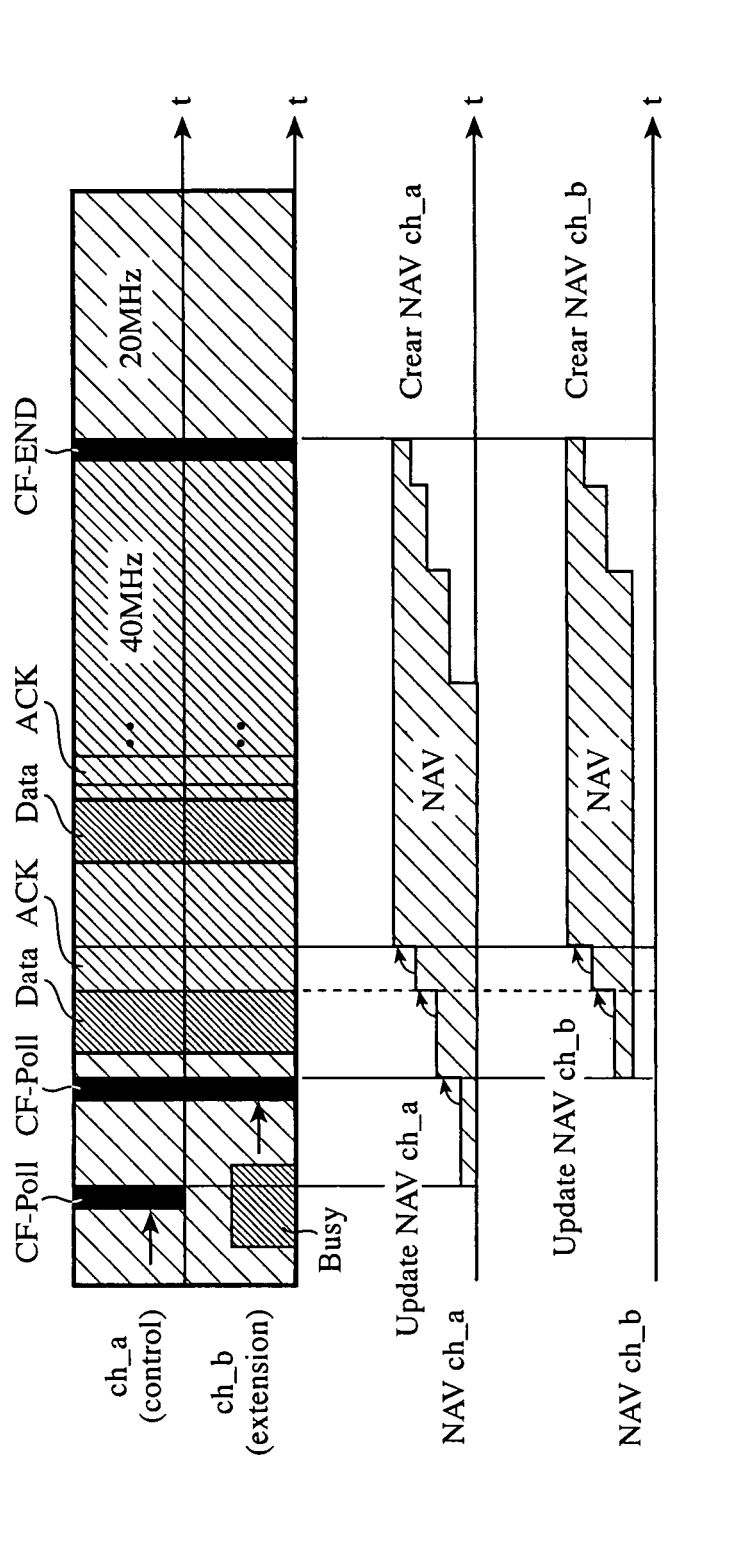
FIG. 8 is an explanatory diagram showing a "Channel Management" method which a radio LAN system in accordance with embodiment 2 of the present invention uses.

FIG. 8 is an explanatory diagram showing a "Channel Management" method which the radio LAN system in accordance with embodiment 2 of the present invention uses.

When the data transmission prohibition time interval exceeds the maximum prohibition time interval which can be set to the L-SIG field, the radio data generating unit 22 of the terminal control apparatus 1 sets, as the data transmission prohibition time interval, the maximum prohibition time interval which can be set to the L-SIG field for the time being.

The data transmission processing unit 23 of the terminal control apparatus 1 transmits radio data in which the maximum prohibition time interval is set up to both the radio communication terminal L-STA and the radio communication terminal HT-STA by using the radio data generating unit 22, like that of above-mentioned embodiment 1.

When then receiving the radio data transmitted from the terminal control apparatus 1, each of the radio communication terminal L-STA and the radio communication terminal HT-STA prohibits the data transmission using the channel CH_a in the same way as shown in above-mentioned embodiment 1, but, at this time, the data transmission prohibition time interval is shorter than a desired time interval.

The radio data generating unit 22 of the terminal control apparatus 1 then sets, as a data transmission prohibition time interval, a shortfall from the desired time interval to the L-SIG field in order to extend the already-set data transmission prohibition time interval. However, when the shortfall exceeds the maximum prohibition time interval which can be set to the L-SIG field, the radio data generating unit sets the maximum prohibition time interval which can be set to the L-SIG field.

In the example of FIG. 8, because the shortfall exceeds the maximum prohibition time interval which can be set to the L-SIG field, the radio data generating unit sets the maximum prohibition time interval which can be set to the L-SIG field.

The data transmission processing unit 23 of the terminal control apparatus 1 transmits radio data in which a time interval which is the shortfall from the desired time interval (or the maximum prohibition time interval) is set up by the radio data generating unit 22 to both the radio communication terminal L-STA and the radio communication terminal HT-STA.

When then receiving the radio data transmitted from the terminal control apparatus, each of the radio communication terminal L-STA and the radio communication terminal HT-STA updates the already-set data transmission prohibition time interval according to the contents set to the L-SIG of the radio data.

Until the data transmission prohibition time interval reaches the desired time interval, the radio data generating unit 22 of the terminal control apparatus 1 sets a time interval which is a shortfall from the desired time interval (or the maximum prohibition time interval) to the L-SIG field repeatedly, and the data transmission processing unit 23 transmits radio data to both the radio communication terminal L-STA and the radio communication terminal HT-STA repeatedly.

In the example of FIG. 8, the data transmission processing unit transmits radio data four times so as to update the already-set data transmission prohibition time interval three times.

As can be seen from the above description, in accordance with this embodiment 2, when the data transmission prohibition time interval exceeds the maximum prohibition time interval which can be set to the L-SIG field, the radio data generating unit 22 generates radio data a number of times, and the data transmission processing unit 23 transmits radio data to both the radio communication terminal L-STA and the radio communication terminal HT-STA a number of times so as to update the data transmission prohibition time interval. Therefore, the present embodiment offers an advantage of being able to, even when the data transmission prohibition time interval exceeds the maximum prohibition time interval which can be set as the L-SIG field, set up the desired prohibition time interval.

In accordance with above-mentioned embodiments 1 and 2, the radio data generating unit 22 uses a technology which is referred to as "Spoofing" so as to determine the modulation method (Rate) and the data length (Length) so that a data transmission prohibition time interval which can be calculated from the modulation method (Rate) and the data length (Length) becomes equal to a transmission time interval during which CF-END frames are transmitted when releasing the prohibition of the data transmission, as previously shown. There may be a case in which the prohibition of the data transmission can be released earlier than scheduled.

In such a case, when transmitting CF-END frames, the radio data generating unit determines the modulation method (Rate) and the data length (Length) which are set to the L-SIG field so that they indicate that the length of the data transmission prohibition time interval is zero.

As a result, if a situation in which the prohibition of the data transmission can be released earlier than scheduled occurs, because the terminal control apparatus can release the prohibition of the data transmission even before the prohibition time interval which has been set up for the first time elapses, the channel band can be used effectively.

Embodiment 3

In above-mentioned embodiments 1 and 2, the radio LAN system using the channels CH_a and CH_b is shown. It cannot be overemphasized that the number of channels is not limited to two, and three or more channels can be used.

The channels which are used can be channels which are adjacent to one another or channels which are apart from one another.

In above-mentioned embodiments 1 and 2, the terminal control apparatus 1 is disposed, as an access point, separately from the radio communication terminal L-STA, the radio communication terminal HT-STA, and the radio communication terminal HT-MC-STA, as previously shown. As an alternative, as disclosed in IEEE802.11e-D13.0, the radio communication terminal L-STA, the radio communication-terminal HT-STA, and the radio communication terminal HT-MC-STA can serve as the functions of the terminal control apparatus 1 as CAP.

Furthermore, in above-mentioned embodiments 1 and 2, the radio data generating unit 22 incorporates either single-channel-use permission information CHSw.ind(20) or multiple-channels-use permission information CHSw.ind(40) in the L-SERVICE field of the data region, as previously shown. The region in which either single-channel-use permission information CHSw.ind(20) or multiple-channels-use permission information CHSw.ind(40) is included is not limited to the L-SERVICE field as long as the radio communication terminal HT-MC-STA can recognize it. For example, the radio data generating unit can incorporate either single-channel-use permission information CHSw.ind(20) or multiplechannels-use permission information CHSw.ind(40) in a "Reserved Bit" of L-SIG, HT-SIG, MAC, or the like.

INDUSTRIAL APPLICABILITY

As mentioned above, the terminal control apparatus and the radio LAN system in accordance with the present invention can be widely applied to a communications system which has to carry out channel control by using a method which does not produce collision and interference between terminals.

The invention claimed is:

1. A terminal control apparatus comprising:
a use state checking means for checking a use state of a single channel when prohibiting a first radio communication terminal from transmitting data, where said first radio communication terminal is configured to carry out radio communications using the single channel;
a first radio data transmitting means
for generating radio data including information about a data transmission prohibition time interval during which the data transmission is prohibited, where said information is set in a header region which a second radio communication terminal and said first radio communication terminal both recognize, where said second radio communication terminal is configured to carry out radio communications using two or more channels, and where said two or more channels include said single channel, and
for, when said use state checking means finds the single channel being unused, transmitting the generated radio data to said first radio communication terminal through the single channel by using a frame which said first radio communication terminal can recognize; and
a second radio data transmitting means
for, when prohibiting said second radio communication terminal from transmitting data, generating radio data including information about a data transmission prohibition time interval during which the data transmission is prohibited, and
for transmitting the generated radio data to said second radio communication terminal by using said two or more channels.

2. The terminal control apparatus according to claim 1, wherein when the data transmission prohibition time interval to be set in the header region exceeds a prescribed maximum prohibition value, the first radio data transmitting means transmits the radio data to the first radio communication terminal a number of times to update the data transmission prohibition time interval to be recognized by said first radio communication terminal.

3. The terminal control apparatus according to claim 1, wherein the first radio data transmitting means transmits the radio data including the information about the data transmission prohibition time interval in the header region to a radio communication terminal which uses a channel different from the single channel by using said two or more channels.

4. The terminal control apparatus according to claim 1, wherein, when releasing the first radio communication terminal from the prohibition of the data transmission, the second radio data transmitting means incorporates information about the release of the prohibition of the data transmission into a header region which the first and second radio communication terminals both recognize, where said header region is of the radio data to be transmitted to the second radio communication terminal.

5. The terminal control apparatus according to claim 1, wherein, when releasing the second radio communication terminal from the prohibition of the data transmission, the first radio data transmitting means
generates radio data including information about the release of the prohibition of the data transmission, where said information is set in a data region, and
transmits the radio data to said second radio communication terminal by using said two or more channels.

6. The terminal control apparatus according to claim 5, wherein the first radio data transmitting means incorporates, as the information about the release of the prohibition of the data transmission, multiple-channels-use permission information indicating permission to use two or more channels into the data region.

7. The terminal control apparatus according to claim 1, wherein the second radio data transmitting means incorporates, as the information about the data transmission prohibition time interval, single-channel-use permission information indicating permission to use a single channel into the data region.

8. A control method for a radio LAN system including a first radio communication terminal which carries out radio communications using a single channel, a second radio communication terminal which carries out radio communications using two or more channels containing the single channel, and a terminal control apparatus which controls the radio communications of said first and second radio communication terminals, said control method comprising:
checking, by the terminal control apparatus, a use state of the single channel when said terminal control apparatus prohibits the first radio communication terminal from transmitting data;
first generating radio data, by the terminal control apparatus, including first information about a data transmission prohibition time interval during which the data transmission is prohibited, where said first generating includes setting said first information in a header region which a second radio communication terminal and said first radio communication terminal both recognize, where said second radio communication terminal is configured to carry out radio communications using two or more channels, and where said two or more channels include said single channel;
first transmitting the first generated radio data to the first radio communication terminal through the single channel by using a frame which said first radio communication terminal can recognize when said checking indicates that the single channel is unused;
second generating radio data, when the terminal control apparatus prohibits the second radio communication terminal from transmitting data, including second information about a data transmission prohibition time interval during which the data transmission is prohibited; and
second transmitting the second generated radio data to the second radio communication terminal by using said two or more channels.

9. The control method according to claim 8, the method further comprising:
first reading, with the first radio communication terminal, the first information from the header region when receiving the first generated radio data, and stopping transmitting data from the first radio communication terminal during the prohibition time interval indicated in said first information, and
second reading, with the second radio communication terminal, the second information from the data region when receiving the second generated radio data, and stopping transmitting data during the prohibition time interval indicated in said second information.

10. The control method according to claim 8, the method further comprising:

third generating radio data, with the terminal control apparatus, when releasing the second radio communication terminal from the prohibition of the data transmission, said third generated radio data including third information about the release of the prohibition of the data transmission, where said third generating includes setting said third information in a data region of the generated radio data, and third transmitting the third generated radio data to said second radio communication terminal by using said two or more channels.

11. The control method according to claim 10, wherein said third generating further includes incorporating, as the information about the release of the prohibition of the data transmission, multiple-channels-use permission information indicating permission to use two or more channels into the data region.

12. The control method according to claim 8, wherein said first generating further includes incorporating, as the information about the data transmission prohibition time interval, single-channel-use permission information indicating permission to use a single channel into the data region.

13. The control method according to claim 8, said first transmitting including transmitting the first generated radio data a number of times to update the data transmission prohibition time interval to be recognized by said first radio communication terminal when said first information includes a data transmission prohibition time interval greater than a prescribed maximum value.

\* \* \* \* \*